T. H. HOLROYD.
ELASTIC FLUID TURBINE.
APPLICATION FILED APR. 20, 1911.

1,008,824.

Patented Nov. 14, 1911.

5 SHEETS—SHEET 1.

Witnesses
Jas. K. McCathran
John H. Siggers

Inventor
Thomas H. Holroyd
By E. G. Siggers
Atty.

T. H. HOLROYD.
ELASTIC FLUID TURBINE.
APPLICATION FILED APR. 20, 1911.

1,008,824.

Patented Nov. 14, 1911.

5 SHEETS—SHEET 3.

Witnesses
Jas. K. McCathran
John D. Siggers

Inventor
Thomas H. Holroyd
By E. G. Siggers
atty.

COLUMBIA PLANOGRAPH CO., WASHINGTON, D. C.

T. H. HOLROYD.
ELASTIC FLUID TURBINE.
APPLICATION FILED APR. 20, 1911.

1,008,824.

Patented Nov. 14, 1911.
5 SHEETS—SHEET 4.

Witnesses
Jas. K. McCathran
John D. Siggers

Inventor
Thomas H. Holroyd
By E. G. Siggers
atty.

T. H. HOLROYD.
ELASTIC FLUID TURBINE.
APPLICATION FILED APR. 20, 1911.

1,008,824.

Patented Nov. 14, 1911.
5 SHEETS—SHEET 5.

Witnesses
Jas. K. McCathran
John B. Siggers

Inventor
Thomas H. Holroyd
By E. G. Siggers
atty.

COLUMBIA PLANOGRAPH CO., WASHINGTON, D. C.

UNITED STATES PATENT OFFICE.

THOMAS HOWARD HOLROYD, OF RICHMOND, ENGLAND.

ELASTIC-FLUID TURBINE.

1,008,824.  Specification of Letters Patent.  Patented Nov. 14, 1911.

Application filed April 20, 1911. Serial No. 622,399.

*To all whom it may concern:*

Be it known that I, THOMAS HOWARD HOLROYD, a subject of His Majesty the King of England, residing at 34 Morley road, Richmond, in the county of Surrey, Kingdom of England, have invented a certain new and useful Improved Reversible Compound Explosive or Elastic-Fluid-Pressure Turbine, of which the following is a specification.

This invention relates to fluid pressure turbines of the kind in which the rotor is provided with blades in series and the stator with forward and reverse nozzles arranged in pairs.

Now the present invention has for its object to provide an improved reversible explosive or elastic fluid or fluid pressure turbine wherein blades are formed on the rotor disk of angularly disposed boxes or frames divided into compartments on their sides and open at their inner and outer ends.

The invention consists in the improved construction, arrangement and combination of parts hereinafter described, constituting the improved reversible elastic fluid turbine.

According to this invention I provide among other features an improved construction of turbine wheel or motor whereby the vanes are adapted for either forward or reverse running without alteration; an improved arrangement of the motive fluid nozzles and passages; and improvements in construction whereby the turbine wheels may be provided directly with tires or rims for application to the wheels of motor road or rail vehicles, flying machines, vessel propellers, electrical field magnets and armatures or other like uses.

Figure 1:
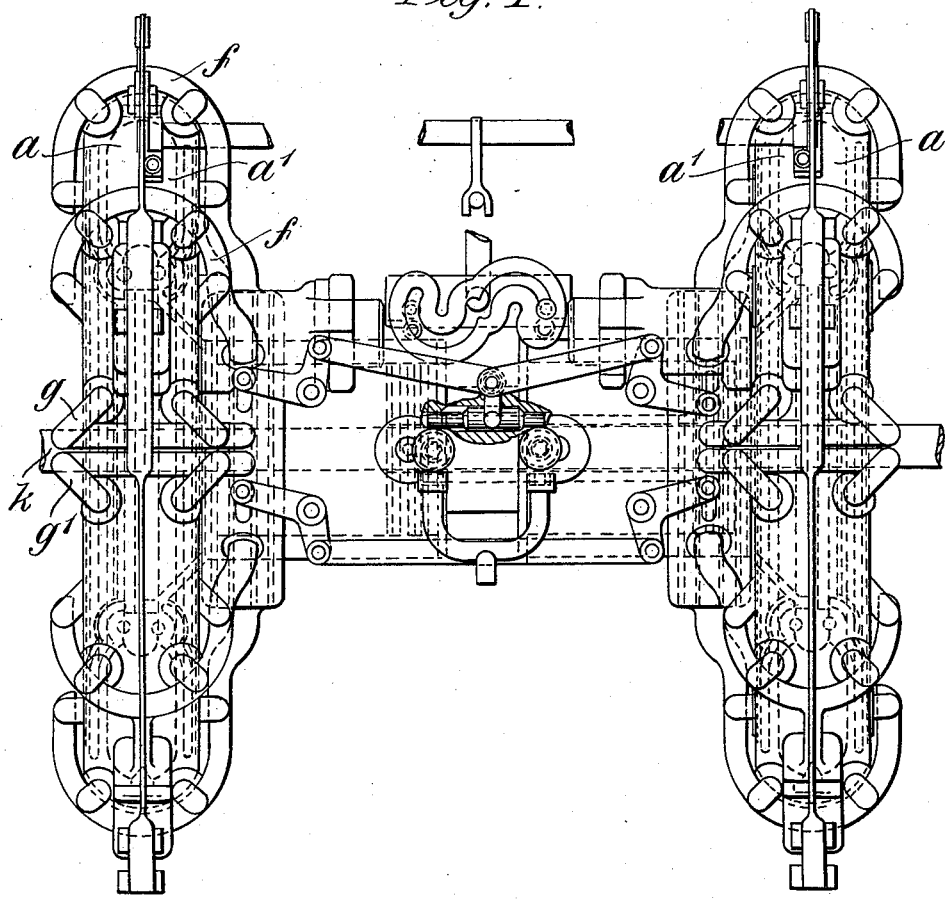
Figure 2:
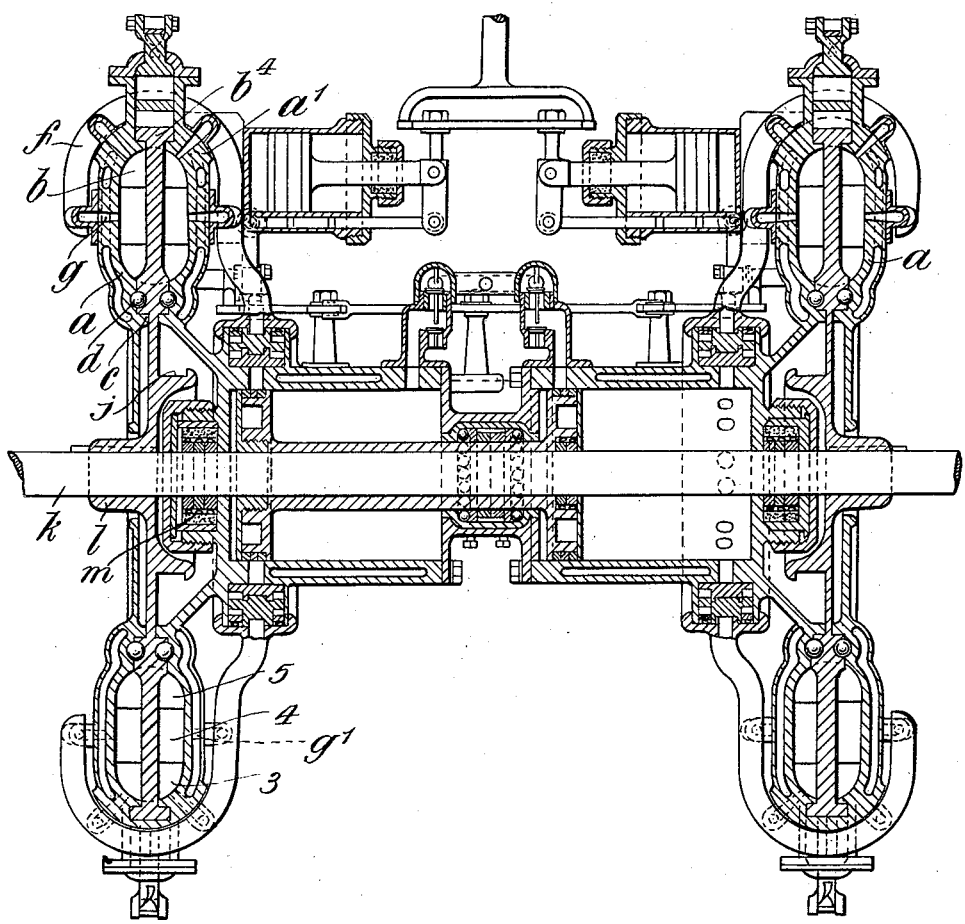
Figure 3:
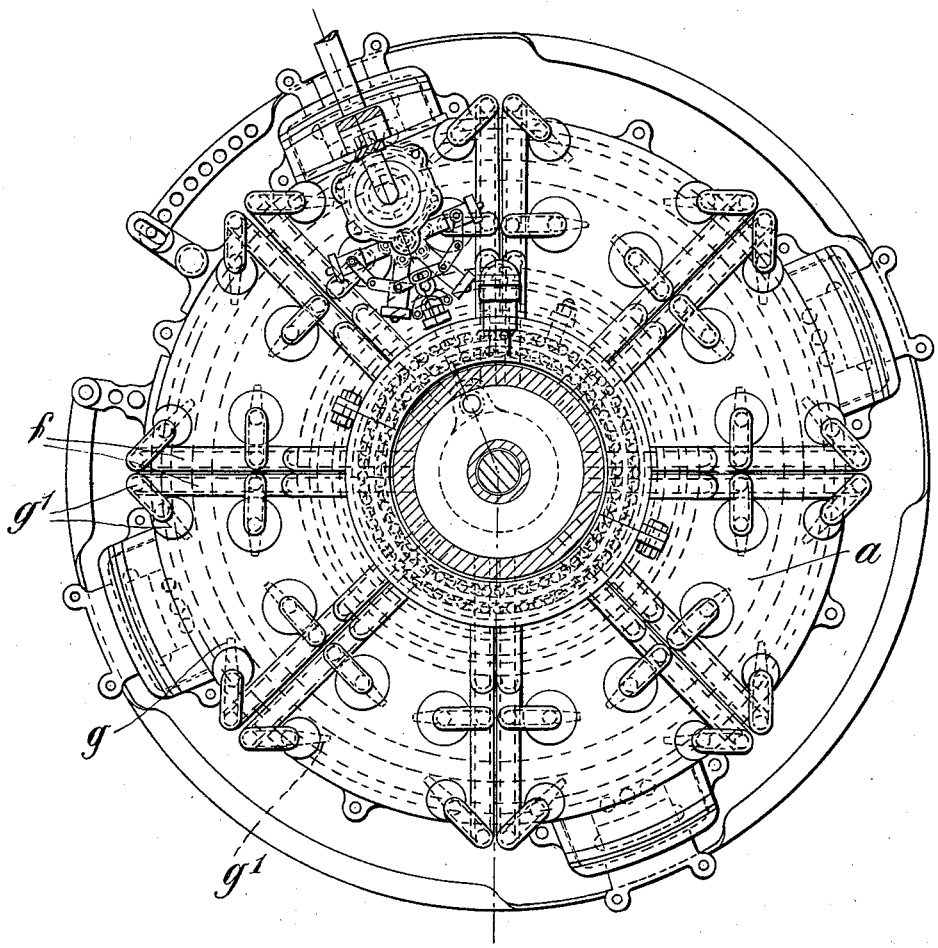
Figure 4:
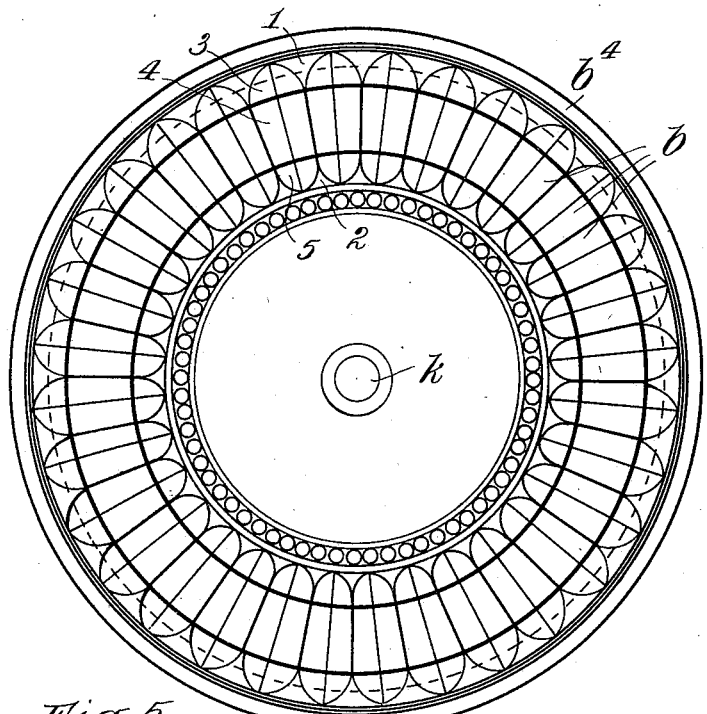
Figure 5:
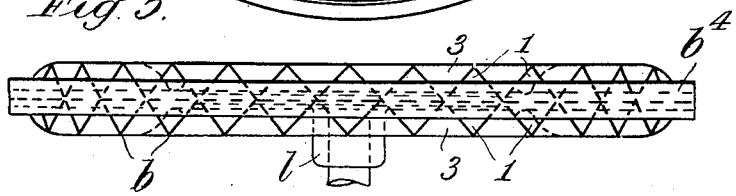
Figure 6:
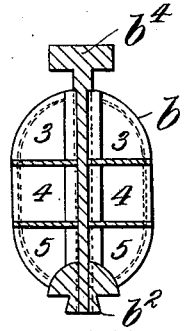
Figure 8:
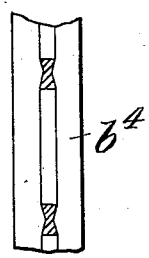

Figure 1 is a plan view of a pair of turbine wheels constructed according to my invention and mounted in combination with an internal combustion pressure generator; Fig. 2 is a sectional elevation thereof; Fig. 3 is a sectional elevation of the stator casing; Figs. 4 and 5 are detail views of the turbine blade wheel and disk; Figs. 6 to 11 are detail views hereinafter referred to, Fig. 6 being a radial section intermediate of two blade boxes shown in Fig. 7 and showing the brake or like rim in place.

In carrying out my invention the outer casing or stator is made up of two or more sections $a\ a$ suitably bolted or otherwise fastened together so as to provide in cross section an oval or other shaped annular chamber in which the blades $b$ revolve and a circular inner groove $c$ between gas tight antifriction bearings $d$ in which the blade disk $b'$ passes. The turbine blade wheels $b$ are of special composite construction and may be, as in Figs. 6 to 9, built up on a suitable disk or wheel $b'$ of a plurality of angularly disposed metal boxes $b$ which may be dovetailed at $b^2$ to the wheel or shaft disk $b'$ and to each other at $b^3$; a brake or other rim $b^4$ being provided to bind the whole together and give the greatest resistance to the fluid pressure. Or as in Figs. 2, 4, and 5 the whole of the boxes $b$ can be made in one piece with the disk $b'$. The blade boxes $b$ which are preferably disposed at a suitable angle to the plane of delivery of the jets therefore divide the rotor up into top or outer 1, bottom or inner 2, and one or more intermediate series of compartments or sections 3, 4 and 5 each of which forms a separate chamber on either side of their center or diagonal webs or lines. An appropriate number of lines or series of forward and reverse nozzles $g'\ g'$ are provided and are so disposed as to project the jets into the top 1 and bottom 2, and side line of compartments 3, 4 and 5 formed by the blade box $b$.

The sectional construction of the blade boxes $b$ facilitates connection to the shaft or wheel disk $b'$ and disconnection for repair. The wheel disk $b'$ and rim $b^4$ are cut away in parts to admit the dovetails on the blade boxes and allow of their being slid into position around the circumference of the disk, the whole then being keyed firmly, and the said opening filled up to bind the whole together so as to form an even part of the rim, but this sectional arrangement may be readily varied.

The conduits $f$ and nozzles $g\ g'$ protrude from or are otherwise formed with relation to the turbine casing $a\ a'$ and deliver the motive fluid in either desired forward or backward direction and the nozzles are so arranged as to deliver the energy in a concentrated manner at a suitable angle on to the sides and in to the ends of the blade boxes $b$. For stopping or for reversing the direction of the turbine any suitable form of cut off and reversing valve can be employed to cut off the supply of fluid to both or either the forward or backwardly disposed set of nozzles. One or more exhaust passages (not shown) are formed in the sides of the solid casing $a\ a'$ or they may if desired be formed independently around the turbine circumference according to the circumstances for which it is used. This method of delivering the motive fluid all around the blades forms an important feature of the turbine construction.

Figure 7:
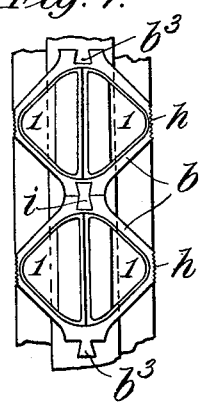
Figure 9:
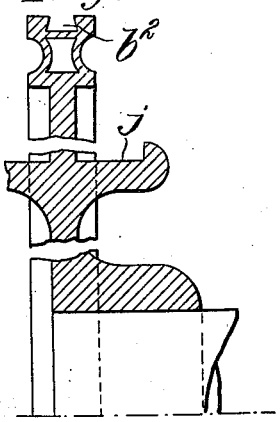

The angular side points or side corners of the blade boxes $b$ may be cut off flat as shown at $h$ Fig. 7 and are provided with serrated or small V grooves radial striations which act as small blades as the blade boxes themselves are passing the nozzle orifices and the corner points of such flat portions may be curved over so as to form pockets or gripping edges for the motive fluid and to prevent its escape past the edges of the box. For securing the separate blade boxes firmly in position the dovetails may be formed on the members themselves or only dovetailed recesses can be made and intermediate double dovetail members or dowels $i$ Fig. 7 employed therebetween.

An intermediate brake rim $j$ may be provided on the turbine wheel or disk $b'$ or on its axle boss according to requirements.

Figure 10:
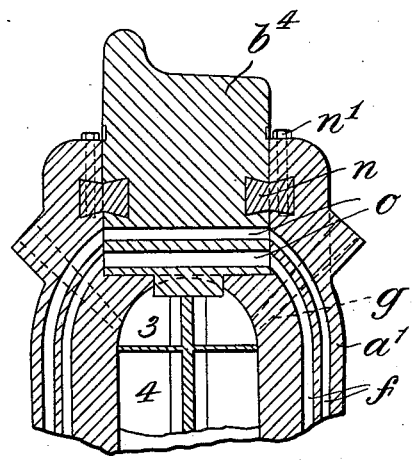
Figure 11:
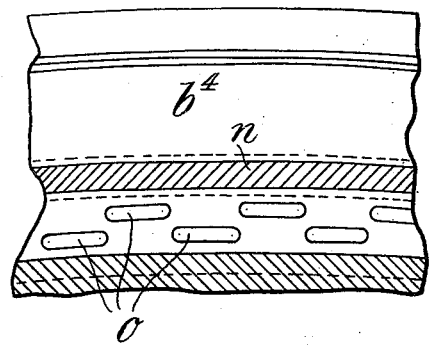

In stationary turbines the turbine wheel would be secured to a shaft $k$ passing out through bearings $l$ and stuffing boxes $m$ in the outer casing but in cases where they serve as motor road, rail or other wheels the rotor $b\ b'$ could be otherwise mounted.

Where the turbine wheels themselves form traction wheels or the armatures of a dynamo electric machine the tires or rims $b^4$ can be attached directly to the turbine wheels $b$ which would be made to pass out through an annular opening in the casing $a\ a'$ Figs. 10 and 11. For the purpose of holding the two halves of the casing $a\ a'$ to the wheel rim $b^4$ or other like part, I may (Figs. 10 and 11) provide one or more openings in the casings and the rim of the wheel to allow a segment of dovetail $n$ to be locked into the corresponding dovetails cut in the wheel rim $b^4$ and the parts of the casing, just sufficient room or gap being provided to admit of connection of the respective end and side dovetails; metal dovetails $n$ are so arranged as to give the greatest resistance to the outward or inward pressure and they are kept stationary by set screws $n'$ or the like. The wheel rims $b^4$ revolve freely around the dovetail rings and the two halves $a\ a'$ of the turbine casing which could in such case be bolted together through the lower or inner part of the casing.

In Figs. 10 and 11 the motive fluid forward and reverse energy conduits $f\ f$ are shown formed in the solid turbine casing and arranged one above another and they serve to conduct energy to suitable nozzle jets $g\ g'$ which terminate immediately inside the turbine casing passing through intermittent openings or slots $c$ in the wheel or other rim $b^4$. These conduits $o$ may form in conjunction with the wheel rim conduits $f$ a continuation of those on the opposite sides which lead to the delivery jets of the turbine blades. These conduits $o$ across the wheel rim may be cut in long or short segments of circles and be supported at intervals by solid parts of the wheel rim. The main fluid conduits $f$ may also be carried under and across the inner casing or formed into the outside of the cylinders on which they are arranged or the motive fluid can be conducted through separate ports leading direct from the inside of the cylinder to conduits on each side of the turbine casing $a\ a'$. Extra circular cut off valves may be required to equalize the delivery of energy to the right or left and give an even thrust all around the blade boxes and their entire circumference. Those conduits may be placed one above and one below the double dovetail locking ring Figs. 10 and 11 in which case metal rings are applied to prevent leakage and the like between the top and bottom forward and reverse conduits. When attaching a supplementary wheel or wheels to the turbines they may be formed in one with the main center shaft or wheel disk. A suitable brake may in some cases be provided to bear on the outer rim of the turbine blade boxes.

While in Figs. 1 to 3 of the drawings only two sets of forward and reverse orifices are shown, it will be understood that a greater number of orifices may be employed and it will also be understood that various other changes in the arrangement of the parts may be made within the scope of the invention.

What I claim as my invention and desire to secure by Letters Patent is:—

1. A reversible turbine comprising a rotor and a stator, blades on the rotor comprising a plurality of diagonally arranged hollow frames or boxes which are divided diagonally and transversely into sections, and nozzle jets on the stator adapted to deliver the impelling gas or fluid on both their ends and outside faces.

2. A reversible turbine comprising a rotor and a stator, blades on the rotor comprising a series of diagonally arranged hollow frames or open ended boxes divided longitudinally into sections by means of the central portion or web of the rotor, circumferential webs dividing said boxes into transverse rows, and a plurality of pairs of forward and reverse nozzles on or in the stator for directing the motive gas or fluid around or within said boxes.

3. A reversible turbine comprising a rotor and a stator, blades on the rotor comprising a plurality of separately formed diagonally arranged hollow frames or boxes, connected to said stator by means of dovetail joints, said boxes being divided diagonally and transversely into sections, and nozzle jets on the stator adapted to deliver the impelling gas or fluid on both their end and outside faces.

In testimony whereof I have hereunto set my hand in presence of two subscribing witnesses this fourteenth day of March, 1911.

T. HOWARD HOLROYD.

Witnesses:
J. S. WITHERS,
T. BLAKEY.

Copies of this patent may be obtained for five cents each, by addressing the "Commissioner of Patents, Washington, D. C."